United States Patent [19]

Vartdal

[11] 4,085,987

[45] Apr. 25, 1978

[54] TACKLE BOX

[76] Inventor: Robert B. Vartdal, Drawer 9, Sanibel, Fla. 33957

[21] Appl. No.: 671,338

[22] Filed: Mar. 29, 1976

[51] Int. Cl.² ............................................. A47B 77/16
[52] U.S. Cl. .................................... 312/269; 312/229; 312/DIG. 33
[58] Field of Search ............... 312/269, 266, 229, 244, 312/271, DIG. 32, DIG. 33; 43/26

[56] References Cited

U.S. PATENT DOCUMENTS

| 912,168 | 2/1909 | Reese | 312/229 |
|---|---|---|---|
| 993,469 | 5/1911 | Stocker | 312/269 |
| 1,903,798 | 4/1933 | Turner | 43/26 |
| 2,017,485 | 10/1935 | Yawman | 312/266 |
| 2,067,830 | 1/1937 | Depew | 312/229 X |
| 2,462,299 | 2/1949 | Applebaum | 312/229 |
| 2,520,064 | 8/1950 | Rones | 312/229 |
| 2,635,027 | 4/1953 | Rasmussen | 312/229 |
| 2,675,290 | 4/1954 | Berry | 312/269 |
| 2,786,245 | 3/1957 | Steinbock, Jr. | 312/269 X |
| 2,828,176 | 3/1958 | Burgh | 312/229 |
| 3,410,018 | 11/1968 | Woolworth | 312/269 |
| 3,834,781 | 9/1974 | Logsdon | 312/229 |
| 3,870,388 | 3/1975 | Löfgren | 312/257 A |

Primary Examiner—Paul R. Gilliam
Assistant Examiner—Victor N. Sakan

[57] ABSTRACT

A fishing tackle box includes a lower box section and an upper box section. The lower box section has a lower wall which is depressed centrally and has an opening therein through which water may drain. The tackle box is provided with shelves having perforated lower walls thereby permitting the entire interior of the tackle box, when opened, to be readily cleaned with a spray of water to remove corrosive salt water therefrom.

1 Claim, 3 Drawing Figures

U.S. Patent      April 25, 1978      4,085,987
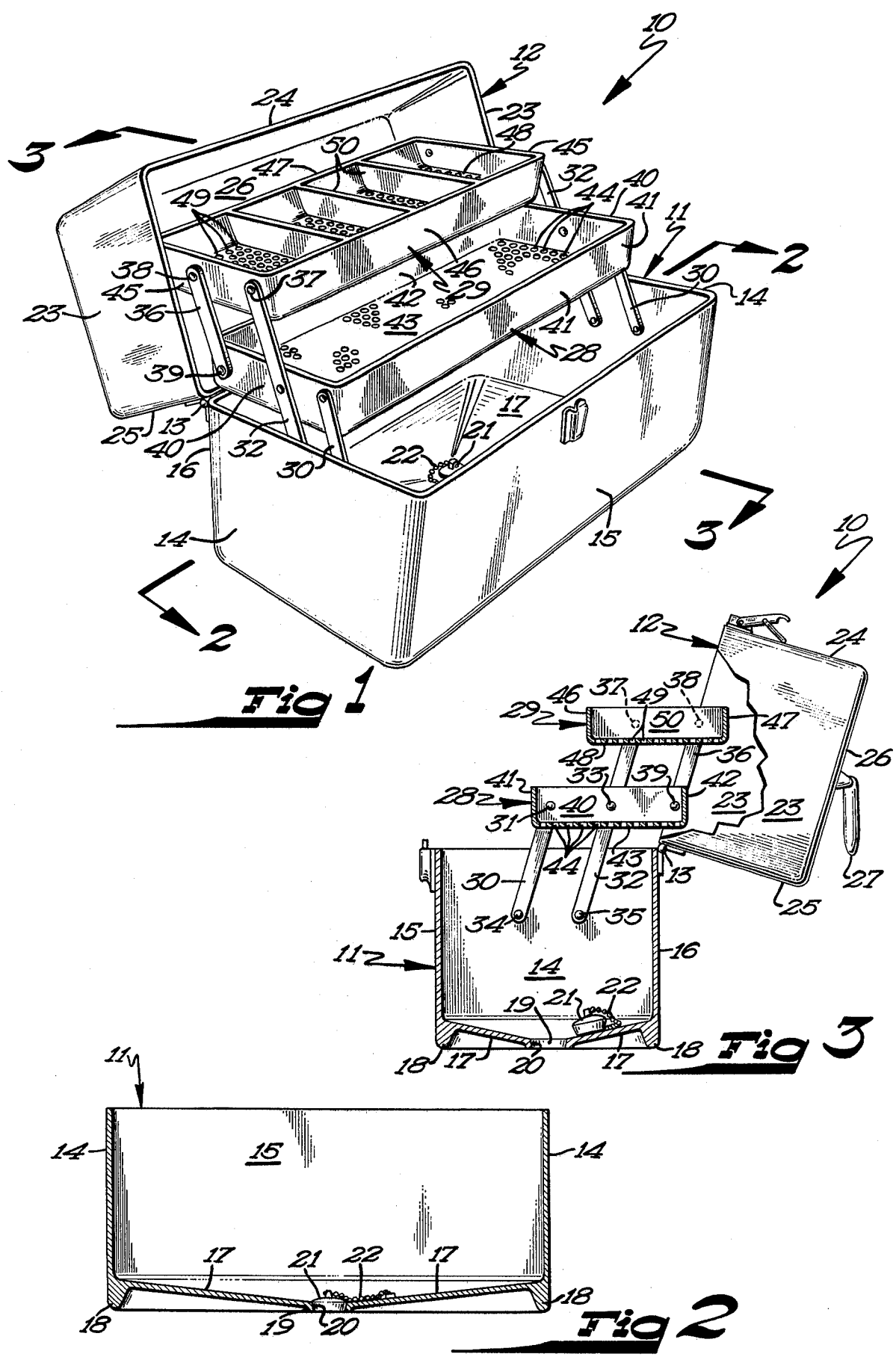

4,085,987

TACKLE BOX

SUMMARY OF THE INVENTION

This invention relates to fishing tackle boxes and more particularly to a fish and tackle box especially adapted for use in salt water fishing.

One of the problems fishermen encounter in salt water fishing is the corrosive effect of salt water on fishing tackle such as lures, hooks, sinkers, etc. Many fishing lures and other tackle are exposed to salt water during a typical fishing trip and on some occasions, the entire interior and contents of a tackle box are exposed to salt water spray. Fishing tackle exposed to salt water should be cleaned as soon as convenient to minimize the corrosive effect of the salt water on the tackle.

It is therefore a general object of this invention to provide a novel tackle box whose interior may be readily cleaned with a spray of water.

A more specific object of this invention is to provide a novel tackle box having an upwardly concave lower wall with a drain opening therein, and having a plurality of shelves, each having a perforated lower wall. With this arrangement, the entire interior of the box may be readily cleaned, while the tackle remains therein, by applying a spray of water to the interior of the box. The perforated construction of the shelves permit water to drain quickly therefrom and upon the bottom wall where the water is directed through a drain opening therein.

These and other objects and advantages of this invention will more fully appear from the following description made in connection with the accompanying drawings, wherein like reference characters refer to the same or similar parts throughout the several views.

FIGURES OF THE DRAWING

FIG. 1 is a perspective view of the novel tackle box;

FIG. 2 is a cross-sectional view taken approximately along Line 2—2 of FIG. 1 and looking in the direction of the arrows and;

FIG. 3 is a cross-sectional view taken approximately along Line 3—3 of FIG. 1 and looking in the direction of the arrows.

DETAILED DESCRIPTION OF THE INVENTION

Referring now to the drawings and more specifically to FIG. 1, it will be seen that one embodiment of the novel tackle box, designated generally by the reference numeral 10, is thereshown. The tackle box 10 includes a generally rectangular shaped lower box member 11 and a generally rectangular shaped upper box member or cover 12 which are hingedly connected together by a hinge 13. The lower box member 11 is comprised of substantially parallel rectangular shaped end walls 14, a front wall 15, a rear wall 16 and a generally upwardly concave bottom wall 17. The lower box member is also provided with downwardly extending support elements 18 which extend downwardly from the entire periphery of the bottom wall 17.

Referring now to FIGS. 2 and 3, it will be seen that the upwardly concave bottom wall 17 extends inwardly and downwardly from the front wall 15, the rear wall 16 and from the end walls 14 and terminates in a central portion having an opening 19 therethrough. An annular downturned lip 20 integral with the bottom wall circumscribes the opening 19. A water impervious stopper type closure element 20 is provided for closing the opening 19, the closure element being attached to one end of an elongate flexible retaining chain 22. The other end of the retaining chain is preferably secured to the upper surface of the bottom wall 17 adjacent the opening 19 to prevent the closure element 21 from being inadvertently misplaced. Because of the upwardly convex configuration of the lower wall, any water falling upon the bottom wall 17 will readily flow towards and through the opening 19 when the closure element 21 is removed therefrom.

The upper box member of cover 12, which is also of rectangular configuration, is provided with end walls 23, a front wall 24, a rear wall 25 and a top wall 26. The top wall 26 is provided with a handle 27 of conventional construction to facilitate carrying of the tackle box 10.

Tackle boxes are used by fishermen for carrying tackle and fishing gear such as lures, sinkers, hooks, etc., and tackle boxes typically include shelves which are often compartmented. In the embodiment shown, the tackle box 10 is provided with a shelf 28 and a shelf 29, each being of elongate generally rectangular shaped configuration. The shelves 28 and 28 are supported by suitable linkage at opposite ends of the shelves. The linkage includes an elongate link 30 which is connected by a pivot 31 to shelf 28. Shelf 28 is also pivotally connected to an intermediate portion of a second link 32 by a pivot 33. The lower end of link 30 is pivotally connected to the lower box 11 by a pivot 34 while the lower end of link 32 is pivotally connected to the lower box member 11 by a pivot 35.

The shelf 29 is pivotally connected to the upper end of link 32 by pivot 37 and is pivotally connected to the upper end of a second link 36 by a pivot 38. The lower end of link 36 is pivotally connected to the end wall of shelf 28. It will be noted that the linkage supporting the shelves 28 and 29 have been described with respect to one end only but it is pointed out that linkage at both ends coact together to permit the shelves to be pivoted between a lowered and raised position. The shelves are shifted to the lowered position (not shown) when the tackle box is in the closed condition. However, the shelves are illustrated in the raised position in FIGS. 1 and 3 since the tackle box is illustrated therein in the opened conditions.

The shelf 28 is comprised of substantially parallel end walls 40, a front wall 41, a rear wall 42 and a perforated bottom wall 43 having openings 44 therein. The shelf 29 is also provided with substantially parallel end walls 45, a front wall 46, a rear wall 47 and a perforated bottom wall 48 having openings 49 therein. The shelf 29 is also provided with a plurality of partitions 50 which extend between and are integral with the front and rear walls of the upper shelf 29. It will also be noted that the partitions 50 have a vertical dimension corresponding to the vertical dimensions of the end walls, front wall and rear wall thereof. These partitions divide the shelf 29 into a plurality of compartments to permit the storage of different kinds of fishing gear in each compartment. Although only two shelves have been illustrated in the embodiment shown, the fishing tackle box may also be provided with additional shelves which may be compartmented in the manner of shelf 29 if such an arrangement is desired. It will further be noted that the lower box member 11 and the upper box member 12 are provided with an over-center releasable lock elements which are unnumbered and which permit the box to be releasably locked in a closed condition.

During normal usage, the fishing tackle box will contain various fishing tackle items normally used by fishermen and the closure element 21 will normally be positioned in closing relation with respect to the opening 19 to prevent the inadvertent loss of any fishing tackle items through the opening. Normally, the fisherman allows the tackle box to remain in an opened condition while he is fishing to permit easy access to the various lures and other fishing tackle items required. When the fishing tackle box is allowed to remain in an opened condition, it is often subjected to salt water spray and the various items contained in the tackle box will also be subjected to the salt water spray. Fishermen also change and replace lures as well as other tackle items and these items will be immersed in salt water during their use. Thus, the salt water fisherman often finds that much, if not all of his fishing tackle, is exposed to salt water, and unless the fishing tackle is cleaned with fresh water, the corrosive effects of the salt water can quickly ruin the fishing tackle.

Because of the construction of most tackle boxes, the fisherman must remove the fishing tackle from the box and separately clean the fishing tackle with fresh water as well as clean the interior of the tackle box.

However, the unique construction of the tackle box 10 permits the entire interior of the box to be readily cleaned while the fishing tackle is allowed to remain therein. This can be accomplished because of the perforate construction of the lower walls of the shelves, the configuration of the lower wall with its drain opening and the provision of support elements for supporting the lower surface of the lower wall in spaced relation with respect to any support surface upon which the tackle box is positioned. Therefore, when a fisherman desires to clean the interior of the box as well as the fishing tackle, therein the box is merely opened and the entire interior of the box including the fishing tackle is sprayed with a spray of water preferably from a conventional water hose. The water will quickly drain through the perforate lower walls of the shelves and upon the lower wall 17 of the lower box section. Because of the upwardly concave configuration of the lower surface 17 which extends downwardly from the marginal portions thereof towards the opening 19 therein, the water will readily drain through the opening. The support element 18 spaces the lower surface of the lower wall above the support surface upon which the tackle box is positioned. Thus the entire cleaning operation can be accomplished quickly and with a minimum of effort.

Thus it will be seen that I have provided a novel fishing tackle box, which is not only of simple and inexpensive construction, but one which is especially adapted for use in salt water fishing.

I claim:

1. A fishing tackle box for use in conjunction with salt water fishing, comprising:

a generally rectangular shaped lower box section having opposed end walls, a front wall, a rear wall, and a generally upwardly concave bottom wall, said bottom wall extending downwardly and inwardly from said front wall, said rear wall and said end walls to a substantially central portion, a drainage opening in said central portion, a removable closure for said opening, attached to a portion of said lower section by a chain or the like, a generally rectangular shaped upper box section defining a cover for said tackle box and being hingedly connected to said lower box section for swinging movement between opened and closed positions, a plurality of shelves pivotedly mounted on said lower box section by interconnecting arms and adapted to be enclosed between the upper and lower box sections, each shelf including upstanding peripheral walls and a perforated bottom wall whereby when said tackle box is opened and the interior thereof sprayed with fresh water to clean the box and its contents said water will readily drain from the shelves through the perforate openings therein into the lower box section and through said central opening, said lower box section is provided with integral downwardly projecting support elements at the periphery of said bottom wall, said support elements extending below the top of said drainage opening, whereby said water may flow freely from said fishing tackle box, at least one of said shelves is compartmented and adapted to receive fishing gear or the like, said shelves are so arranged with respect to each other, that said fresh water may be poured in each shelf independently.

* * * * *